Sept. 28, 1948.  M. WERNLI  2,450,064
BARREL AND BREECH RING WITH SPRING
MEANS FOR CONNECTING THE SAME
Filed May 18, 1945
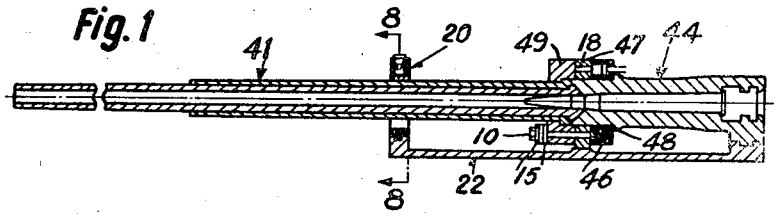
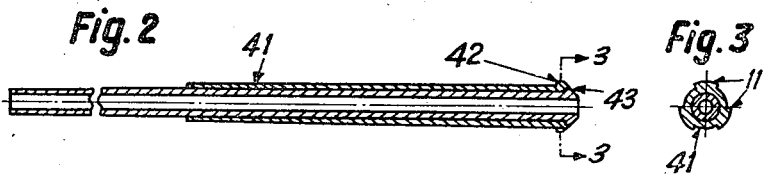
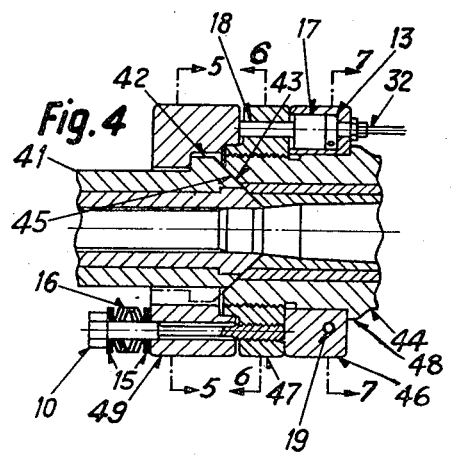
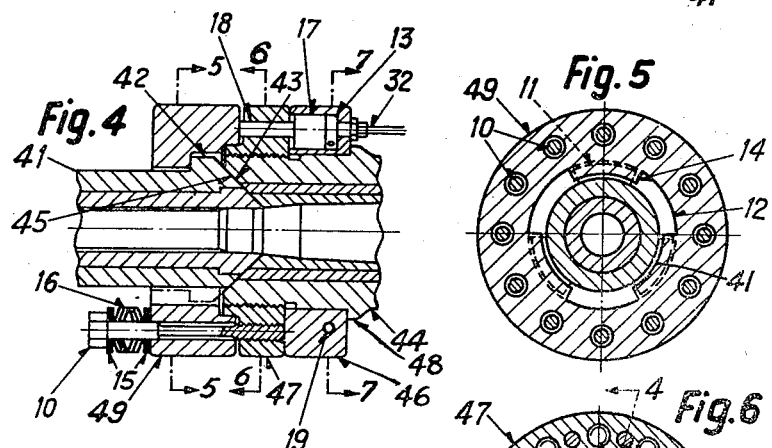
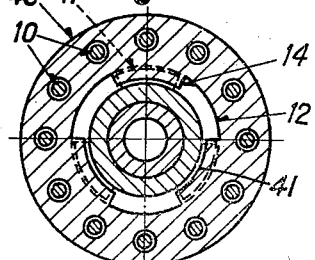
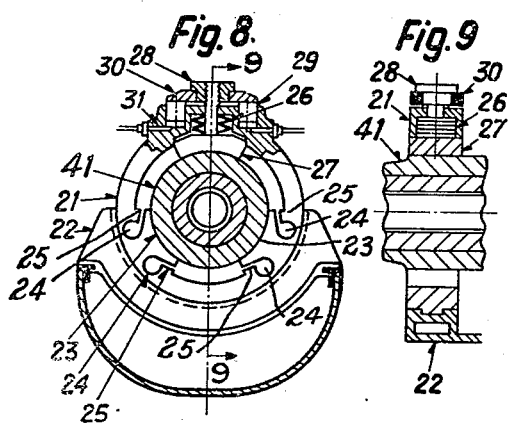
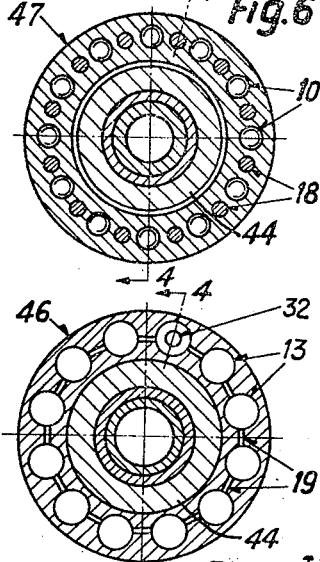
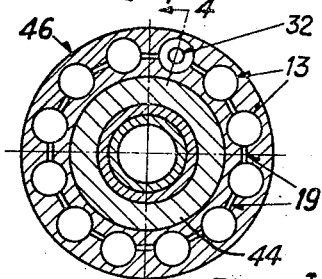
INVENTOR:
Max Wernli
BY
Richards & Geier
ATTORNEYS Patented Sept. 28, 1948

2,450,064

UNITED STATES PATENT OFFICE 2,450,064

BARREL AND BREECH RING WITH SPRING MEANS FOR CONNECTING THE SAME

Max Wernli, Schaffhausen, Switzerland, assignor to Verwaltungsgesellschaft der Werkzeugmaschinenfabrik Oerlikon, Zurich-Oerlikon, Switzerland Application May 18, 1945, Serial No. 594,475
In Switzerland April 12, 1944

Section 1, Public Law 690, August 8, 1946
Patent expires April 12, 1964

10 Claims. (Cl. 89—14)

In guns in which the barrel is subjected to heavy strain, it must be replaced after a certain number of shots. In small bore arms simple means are known for effecting this replacement. These means, however, are unsuitable for larger bores in which the barrel weight is too great. Since, in guns of larger bore as well, the strain on the grooves must not exceed the admissible limit, it is desirable to provide means for securing a quick replacement of the barrel in this case also.

The present invention refers to a construction enabling this purpose to be fulfilled. This object is secured by subdividing the barrel into two parts, and keeping together both barrel parts by elastic means applying the required pressure; the process of taking apart and exchanging a barrel part is effected by overcoming the elastic force.

The partition of the barrel may take place directly between the cartridge chamber and the beginning of the rifling grooves, or in the cartridge chamber. The means required for joining the two barrel parts, and also the means for releasing the application of the pressure, may be of various design, so that the constructional example described below represents only one of the possibilities of realisations.

In the enclosed drawing:

Fig. 1 is a barrel and barrel extension for breech ring, in longitudinal section, Fig. 2 is the barrel, in longitudinal section, Fig. 3 is a section along the line 3—3 in Fig. 2, Fig. 4 is a longitudinal section through the barrel at its joint with the organs applying the elastic pressure, and the parts releasing the application of that pressure, along the lines 4—4 of Figs. 6 and 7, Fig. 5 is a section along the line 5—5 in Fig. 4, Fig. 6 is a section along the line 6—6 in Fig. 4, Fig. 7 is a section along the line 7—7 in Fig. 4, Fig. 8 is a section along the line 8—8 in Fig. 1, Fig. 9 is a section along the line 9—9 in Fig. 8.

The barrel 41 is provided with a shoulder 42 connected with the cone 43. The barrel extension or breech ring 44 is fitted with a corresponding counter-cone 45 (Fig. 4). On the barrel extension or breech ring 44 is fitted a ring 46 pressed by the threaded ring 47 against the shoulder 48 of the breech ring 44. Cone 43 of barrel part 41 is pressed by the ring union 49 by means of screws 10 into the counter cone 45 of the barrel extension or breech ring 44. In order to enable barrel 41 to be connected with the breech ring 44 without having to unscrew the ring union 49, the shoulder 42 is provided with recesses, say at three places, thus forming the claws 11. In a similar manner the ring union 49 is provided in three places with somewhat larger recesses 12, forming claws 14, so that the claws 11 of barrel part 41 can be pushed through the recesses 12 of the ring union 49 and made to rotate by 60° behind the latter; in this way the claws 14 of the ring union 49 overlap the claws 11 of the shoulder 42. Between the screw heads 10 and the ring union 49 are arranged—between the washers 15—(Fig. 4) elastic discs 16 by means of which the barrel 41 is elastically pressed on to the barrel extension or breech ring 44. Now, in order to remove the barrel part 41 without having to unscrew or even release the screws 10, there are provided in the ring 46 pressure pistons 17 seated in holes 13. The ends 18 of the pressure pistons reach through the threaded ring 47 and exert a pressure on the ring union 49. If now, under the action of a pressure fluid or hydraulic pressure—oil, by way of example—fed behind the pistons 17 through the conduit 32 and the connecting passages 19, the pistons 17 are subjected to such a pressure that the springs 16 are compressed, the barrel part 41 may be rotated 60° and its claws 11 pulled out through the recesses 12 of the ring union 49; a new barrel part can be inserted at the same time. If required, the barrel part 41 can be clamped in a guide clamp 20, as shown in Figs. 8 and 9. The barrel 41 is lodged in a ring 21 rigidly connected with the mounting part 22. The upper half of the ring 21 is recessed, whilst the lower half is recessed only to the extent of approximately ⅓, thus leaving two guiding surfaces 23. Behind these guiding surfaces are arranged holes 24 and slots 25, in order that these guiding surfaces shall cling elastically to the barrel. The ring 21 is further provided with a hole in which is lodged the shaft of the clamping jaw 27 which is under the pressure of the springs 26. In the ring 21 are lodged the pistons 29 pressing against the disc 30 supported on the collar of the threaded nut 28. Through the passages 31 a pressure fluid is fed under the pistons 29, causing the disc 30— and consequently the clamping jaw 27 as well— to be lifted up, the springs 26 being at the same time compressed. The use of curved ring plates as springs will be found suitable. The pressure of the fluid medium can be produced through a hand press pump fitted to the gun at a suitable place. A suitable hydraulic pressure medium is oil.

I claim:

1. In a gun, in combination, a barrel, a breech ring, spring tensioned means carried by said breech ring and releasably connecting said barrel to the breech ring, and hydraulic pressure operated means associated with the first mentioned means and so constructed and arranged to compress the same and release the barrel from the breech ring.

2. In a gun, in combination, a barrel, a breech ring, a ring connected to said breech ring, a ring union connected to said ring and movable axially with respect thereto, resilient means associated with said ring union and urging the same axially toward said ring, said ring union releasably engaging said barrel and retaining said barrel in alinement with and against said breech ring, and pressure operated means carried by said ring and in operative engagement with said ring union to urge the same axially away from said ring and compress said resilient means to release the barrel from the breech ring.

3. In a gun as descried in claim 2 wherein said resilient means comprises spring-loaded screws connected to said ring and urging said ring union axially toward said ring.

4. In a gun as described in claim 2 wherein said resilient means include curved resilient discs.

5. In a gun in combination, a barrel, a plurality of radially spaced claws formed on said barrel and adjacent the rear end thereof, a breech ring, a ring connected to said breech ring, a ring union connected to said ring and axially movable with respect thereto, said ring union having radially spaced claws formed thereon equal in number to said first mentioned claws, said claws being so constructed and arranged that the claws on the barrel pass between the claws on the ring union and are in position to be clamped by the same when the barrel is rotated, resilient means associated with said ring union and urging the same axially toward said ring, said ring union claws releasably engaging said barrel claws and retaining said barrel in alinement with and against said breech ring, and pressure operated means carried by said ring and in operative engagement with said ring union to urge the same axially away from said ring and compress said resilient means to release the barrel from the breech ring.

6. In a gun, in combination a barrel, a breech ring, a ring connected to said breech ring, a ring union connected to said ring and movable axially with respect thereto, resilient means associated with said ring union and urging the same axially toward said ring, said ring union releasably engaging said barrel and retaining said barrel in alinement with and against said breech ring, a plurality of pressure operated pistons mounted axially and radially spaced in said ring and in operative engagement with said ring union to urge the same axially away from said ring and compress said resilient means to release the barrel from the breech ring.

7. In a gun, in combination, a barrel having a cone shaped rear end, a breech ring formed with a counter-cone and for sealing engagement with said cone shaped barrel end, spring tensioned means carried by said breech ring and releasably connecting said barrel to the breech ring, and hydraulic pressure operated means associated with the first mentioned means and so constructed and arranged to compress the same and release the barrel from the breech ring.

8. In a gun, in combination, a barrel, a breech ring, spring tensioned means carried by said breech ring and releasably connecting said barrel to the breech ring, pressure operated means associated with the first mentioned means and so constructed and arranged to compress the same and release the barrel from the breech ring, and resilient guiding means releasably clamping said barrel intermediate the ends thereof.

9. In a gun and gun mount, in combination, a barrel, a breech ring, spring tensioned means carried by said breech ring and releasably connecting said barrel to the breech ring, pressure operated means associated with the first mentioned means and so constructed and arranged to compress the same and release the barrel from the breech ring, resilient guiding means supported by said mount and releasably clamping said barrel intermediate the ends thereof, said last-mentioned means further comprising at least one clamping jaw, and resilient means urging said clamping jaw against said barrel.

10. In a gun and gun mount, in combination, a barrel, a breech ring, spring tensioned means carried by said breech ring and releasably connecting said barrel to the breech ring, pressure operated means associated with the first mentioned means and so constructed and arranged to compress the same and release the barrel from the breech ring, resilient guiding means supported by said mount and releasably clamping said barrel intermediate the ends thereof, said last mentioned means further comprising a ring positioned about said barrel and having resilient clamping faces formed therein and at least one clamping jaw, resilient means urging said clamping jaw against said barrel, and pressure operated means in operative engagement with said clamping jaw to urge said clamping jaw away from the barrel and compress said last mentioned resilient means.

MAX WERNLI.

No references cited.